Sept. 11, 1934. W. NAGEL 1,973,648
ATTACHMENT FOR EYEGLASSES
Filed July 10, 1933

INVENTOR.
Willie Nagel

BY Lancaster, Allwine and Rommel
ATTORNEYS.

UNITED STATES PATENT OFFICE 1,973,648

ATTACHMENT FOR EYEGLASSES

Willie Nagel, Fredericksburg, Tex.

Application July 10, 1933, Serial No. 679,784

8 Claims. (Cl. 88—41)

This invention relates to resilient clips and more particularly to an attachment for eyeglasses and spectacles and the like so as to retain the same, when not in use, in positions upon the person and elsewhere.

Many persons employ eyeglasses only at times, carrying them about so that they will be available when wanted, and frequently place them in a pocket. However, since the eyeglass frame and associated portions are generally smooth, the eyeglasses may easily slip from the pocket and be broken or if the pocket be large, may drop to the bottom of the same and become wedged therein or take such position that they are easily broken. If temporarily laid down, when not in use, the eyeglasses are also apt to become broken or mislaid.

The principal object of this invention is to provide a clip which will enable the owner to carry eyeglasses and the like about in safety in the pocket or attached to the clothing in such a position that the eyeglasses will not be apt to become broken and will be available for use at any time.

Another object is to provide a resilient clip adapted to not only grip a member over which it is slipped but will also retain a second member in a set position, and enable both members to be clipped to a suitable support. Thus, not only may the folded eyeglasses for instance be carried clipped to the clothing but both temples of the eyeglasses may be securely held in a folded position.

Another object is to provide such a device, taking up but very little room, light in weight, and adapted to be applied to temples and similar members having curved portions along which the device must slide.

Another object is to provide a device which, when applied to eyeglasses, will not be apt to scratch nor break the lens at any time.

Still another object is to provide such a device which may be manufactured at a relatively low cost.

Other objects and advantages of the invention will be apparent during the course of the following detailed description, taken in connection with the accompanying drawing forming a part of this specification and in which drawing:—

Figure 1:
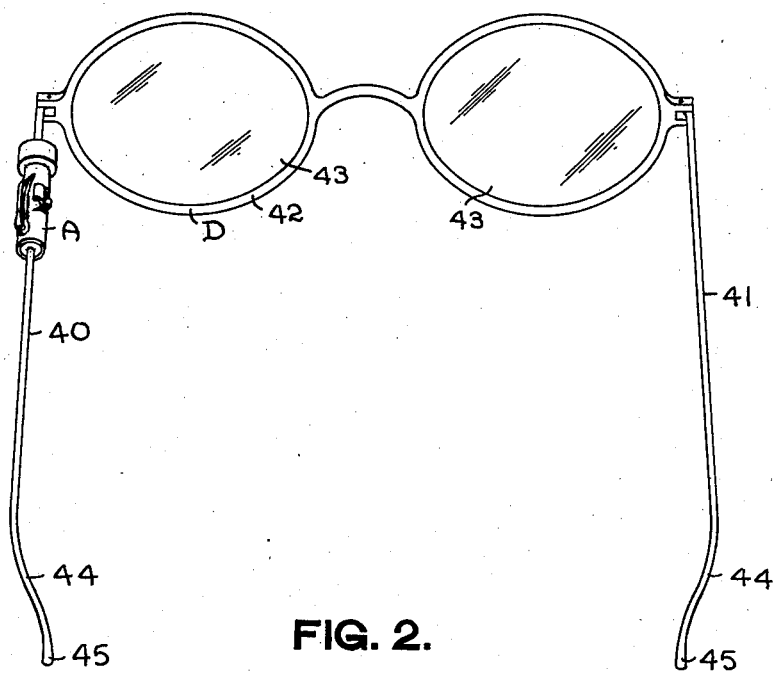
Figure 1 is a perspective view of the improved clip attached to a pair of conventional eyeglasses with the temples extended as when the glasses are worn.

In the drawing, wherein for the purpose of illustration is shown only a preferred embodiment of the invention, the letter A designates generally the improved clip comprising a core member B and a sheath or housing member C, the letter D a pair of conventional eyeglasses and E a supporting surface.

The improved clip A, as seen in Figure 1 is relatively small, as compared with the conventional glasses D. The core member B of the clip A comprises an elongate tubular member 10 with a preferably cylindrical enlargement 11 at one end which will be called the outer end. The tubular member 10 and enlargement 11 are preferably integral and may be of rubber, cork, or the like. However, soft rubber is deemed the best since it is both elastic and pliable. It will be noted that the bore 12 thru the tubular member 10 also extends thru the enlargement 11 and is substantially the same diameter thruout.

Figure 3:
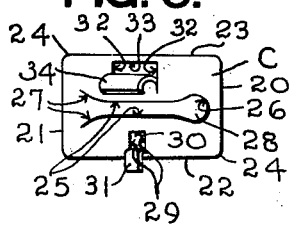
Figure 3 is a plan view of a blank forming a part of the construction.
Figure 4:
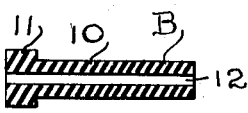
Figure 4 is a section of a core forming part of the novel device.

As for the sheath or housing member C, this preferably is constructed from a substantially rectangular blank having ends 20 and 21 and sides 22 and 23, a length substantially that of the member 10 (not including the enlargement 11) and a width slightly less than the circumference of the tubular member 10. Preferably the corners of this blank are rounded as at 24. By stamping or otherwise, this blank is provided with a pair of longitudinally extending cuts 25 spaced apart from the longitudinal medial line of the blank and ending short of the ends 20 and 21 and joined together at one of their ends by a preferably curved cut 26. The opposite ends of the cuts 25 are preferably flared away from each other as at 27. Thus a clip 28 is formed. The blank is further provided with a pair of rather closely spaced apart paralleling cuts 29 at either side of the transverse medial line of the blank and extending to close adjacent the side 22. A further cut 30 at substantially a right angle to the two cuts 29 joins them at their ends farthest from the side 22 and thus a tongue 31 is provided. On the opposite side of the blank from the tongue 31, the blank is provided with a pair of spaced apart paralleling cuts 32 at either side of the transverse medial line of the blank. These cuts are preferably spaced apart a greater distance than the cuts 29 and terminate at one end short of the edge of the side 23. Joining these ends of the cuts 32 is a cut 33 at a right angle to the cuts 32 and of course paralleling the edges of the side 23. Thus a hook 34 is formed, all as well illustrated in Figure 3, for the clip 28 may be slightly bent along the flared portion 27 of the cuts 25 so as to be slightly above the general surface of the blank, the tongue 31 may be first bent outwardly to overhang the side 22 of the blank and the hook 34 curved inwardly away from the side 23 and towards the clip 28 providing an opening 35. The blank forming the member C is preferably of metal which may be easily bent or curved into shape.

Before describing the assembly of the members B and C into the clip A, it would be well to describe somewhat the eyeglasses D shown as the principal object for the application of the clip A. These eyeglasses are of conventional construction and include temples 40 and 41 pivotally attached to a frame 42 carrying lens 43. The temples are generally curved as at 44 at their free ends and terminate in enlargements there, such as beads 45. In folding these conventional glasses, the free ends of the temples 40 and 41 are drawn towards the frame and the temples overlap each other as shown in Figure 2.

Figure 5:
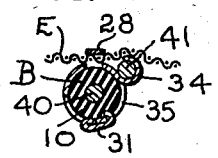
Figure 5 is a view substantially on the line 5—5 of Figure 2 but also including a section of a suitable support for the device.

The novel clip is easily attached to the eyeglasses D by slipping the core member B over one of the temples, for instance the temple 40. Since the core member is preferably of pliable material it will slide over the beaded and curved portions of the temple and may be adjusted along the temple as convenient, preferably taking the position shown in Figure 1. It should be understood that the device is in no sense a cushion for that part of the temple which engages the ear of the wearer, its function being wholly different. When in the position desired, friction will hold the body portion in place. When in place, the sheath portion C may be curved about the tubular member 10 with the clip 28, tongue 31 and hook 34 outwardly. By forcing the extremity of the tongue 31 into the opening 35 in the sheath and causing it to bite into the tubular member 10 as shown in Figure 5, the two portions B and C are held securely together both as to longitudinal movement one with respect to the other but also against rotating one with respect to the other. This arrangement also permits the sheath member to tightly engage the tubular member and compress its walls against the temple 40 so that it will not easily slide along the temple, if the natural elasticity of the tubular member is not sufficient for that purpose. Thus the sheath or housing member when curved about the tubular member 10 provides a wall with the tubular member disposed next to its inner surface and the clip 28 and hook 34 projecting from its outer surface.

Figure 2:
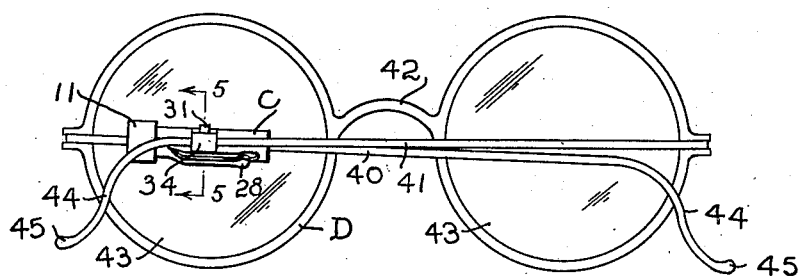
Figure 2 is a plan view of the same with the temples folded.

It can be seen that when the temples 40 and 41 are folded, preparatory to placing the glasses in the pocket or otherwise securing them to the person, the finger pressed against the curved outside surface of the hook 34 serves to revolve the clip A very slightly so that the hook will hook over the temple 41 and retain it as shown in Figures 2 and 5. The clip 28 may now be employed by clipping it over any suitable support E such as the cloth of a pocket, a buttonhole facing, coat lapel or even the cover of a book or the like. It should be noted that the clip need not necessarily take the exact position shown in Figure 2 but may be slid along the temples as convenient.

The enlargement 11 serves to hold the metallic portions of the clip away from the lens, which is important, but it has two other functions for it serves as a non-metallic abutment for the finger when adjusting the clip longitudinally of the temple and also supports the free end of the temple 41 against the wall of the hook 34 slightly canted while this free end is retained against the enlargement and held frictionally thereagainst since the enlargement 11 is not sheathed as is the tubular member 10.

The clip does not interfere with the eyesight and is so light in weight that the wearer is not aware of it when using eyeglasses equipped with it.

Various changes may be made to the form of invention herein shown and described, without departing from the spirit of the invention or the scope of the claims.

What is claimed is:

1. In a clip for attaching eyeglasses, having folding temples, to a support, a housing having a wall providing an inner and an outer surface and also having a support engaging clip and a hook, both projecting from said outer surface, and means on said inner surface for frictionally engaging one of said temples, whereby said hook is adapted to engage the other temple when said temples are folded.

2. In a clip for attaching eyeglasses, having temples, to a support, a temple embracing member of compressible material having a bore, a sheath about said member having a support engaging clip upon the outer side thereof, and means for retaining said sheath in compressing relation about the tubular member.

3. In an attachment for eyeglasses having folding temples, a tubular member of compressible material, a sheath thereabout formed of a rectangular blank having a cut into portion providing a clip extending outwardly from the outer surface of said sheath and a second cut into portion adjacent one longer edge of said blank providing a hook curved outwardly from the outer surface of said sheath and said sheath also having a slot provided by the space in said blank occupied by the material forming said hook, said sheath also provided with a tongue adjacent the edge of said blank opposite said first named edge and aligning with said slot and also projecting into said slot.

4. In an attachment for eyeglasses having folding temples, a tubular member of compressible material, a sheath thereabout formed of a rectangular blank having a cut into portion providing a clip extending outwardly from the outer surface of said sheath and a second cut into portion adjacent one longer edge of said blank providing a hook curved outwardly from the outer surface of said sheath and said sheath also having a slot provided by the space in said blank occupied by the material forming said hook, said sheath also provided with a tongue adjacent the edge of said blank opposite said first named edge and aligning with said slot and also projecting into said slot and into the compressible material of said tubular member.

5. In a device for holding folded the temples of eyeglasses, a tubular temple embracing member and a sheath thereabout provided with a hook, whereby when said device is associated with eyeglasses having folding temples the tubular member is adapted to embrace and engage one folded temple and the hook engage about the other folded temple.

6. In a device for holding folded the temples of eyeglasses, a tubular temple embracing member and a sheath thereabout provided with a hook, said hook projecting outwardly from the outer surface of said sheath and having a curved temple engaging portion, whereby when said device is associated with eyeglasses having folding temples, the tubular member is adapted to embrace and engage one folded temple and the hook engage about the other folded temple.

7. In a device for holding folded the temples of eyeglasses, a tubular temple embracing member having an enlargement at one end thereof of compressible material, and a sheath about said tubular member exclusive of said enlargement, said sheath provided with an outwardly projecting hook whereby when said device is associated with eyeglasses having folding temples the tubular member is adapted to embrace and engage one folding temple, the hook engage about the other folded temple and the enlargement hold said sheath away from the lens of said glasses.

8. In a clip for attaching eyeglasses, having temples, to a support, a sleeve-like housing having a wall providing an inner and an outer surface and also having a support engaging clip projecting from said outer surface, and a member of compressible material extending along the inner surface of said housing for frictionally engaging one of said temples and also extending outwardly and beyond the outer surface of said housing for engagement with the lens of the eyeglasses when said temple is folded, to keep said housing out of engagement with the lens of said eyeglasses.

WILLIE NAGEL.